United States Patent [19]
Nakazaki et al.

[11] 3,975,612
[45] Aug. 17, 1976

[54] WELDING METHOD FOR DISSIMILAR METALS

[75] Inventors: Takamitsu Nakazaki, Takahagi; Hisanao Kita, Hitachi; Tatsuo Yonezawa, Hitachi; Yasuzi Kawada, Hitachi; Hisanori Okamura, Hitachi, all of Japan

[73] Assignee: Hitachi, Ltd., Japan

[22] Filed: June 14, 1974

[21] Appl. No.: 479,506

[30] Foreign Application Priority Data
June 18, 1973 Japan.................... 48-67777

[52] U.S. Cl............................ 219/121 EM; 219/118
[51] Int. Cl.²........................................ B23K 15/00
[58] Field of Search............ 219/121 EM, 121 EB, 219/121 LM, 121 R, 137, 69, 76, 118, 137; 250/493

[56] References Cited
UNITED STATES PATENTS

| | | | |
|---|---|---|---|
| 2,985,747 | 5/1961 | Kutchera | 219/118 X |
| 3,436,515 | 4/1969 | Sayer et al. | 219/121 EM |
| 3,560,700 | 2/1971 | Reidelsturz et al. | 219/121 EM |
| 3,582,605 | 6/1971 | Lamatsch | 219/121 EM |
| 3,617,685 | 11/1971 | Brill-Edwards et al. | 219/121 EB |
| 3,808,395 | 4/1974 | Bailey et al. | 219/121 EM |

OTHER PUBLICATIONS

Metals Handbook vol. 6 8th Ed. pp. 558-560 1971.
"Better, Less Costly Bi-Metal Turbine Wheels EB Welded" reprinted from Welding Engineer Aug. 1962.
"Electron Beam Welding of Bimeta Turbine Wheels" Engineering Report United Aircraft Corp. 1962.

*Primary Examiner*—Bruce A. Reynolds
*Assistant Examiner*—G. R. Peterson
*Attorney, Agent, or Firm*—Craig & Antonelli

[57] ABSTRACT

A method for welding dissimilar metals, wherein a filler metal is deposited on one end of the aforesaid dissimilar metals to be jointed, said filler metal being of the same material as that of another of said dissimilar metals; the outer surface of the weld metal thus deposited is machined to provide a joint surface adapted for welding; and an electron beam welding is applied along the interface formed between said joint surface of said weld metal thus deposited and the joint surface of another of said dissimilar metals.

8 Claims, 6 Drawing Figures

WELDING METHOD FOR DISSIMILAR METALS

This invention relates to a welding method for dissimilar metals by using an electron beam welding, and more particularly to an electron beam welding which is applied for welding stationary blades of a turbine diaphragm to its inner and outer wheels of a material dissimilar to that of the aforesaid stationary blades.

The prior art welded construction of a turbine diaphragm which is adapted to be positioned in opposing relation to a rotor blade within a casing of a steam turbine is prepared according to the steps of: seal-welding a plurality of stationary blades disposed in radial direction to partition walls of a ring form, which walls are disposed in concentric relation to but along the inner and outer circumferences of the stationary blades thus diposed; and applying build-up welding according to the submerged arc welding to weld grooves or spaces defined between the partition walls and the joint surfaces of the inner and outer wheels, which are to be jointed to said partition walls, for providing weld metals filled in said grooves, whereby said stationary blades, inner wheel and outer wheel are welded together.

However, the prior art welded construction of a turbine diaphragm suffers from shortcoming in that a great quantity of heat input imparted during build-up welding according to the submerged arc welding to provide massive weld joints causes deformation in welds of a turbine diaphragm.

Alternatively, even if an electron beam welding method is used in place of conventional submerged arc welding, there arise welding defects in weld joints, because the material of the stationary blades and that of the inner and outer wheels, in general, are dissimilar to each other.

It is accordingly an object of the present invention to provide a welding method for welding dissimilar metals without causing thermal deformation in the welds due to welding heat produced, and more particularly to provide a welding method using electron beam welding.

It is another object of the present invention to provide a welding method for welding dissimilar metal by using electron beam welding in a manner to simplify welding operations.

It is a further object of the present invention to provide a welding method for welding dissimilar metals by using electron beam welding in a manner to avoid welding defects such as non-welded portion in the weld joint of dissimilar metals.

It is a still further object of the present invention to provide a welding method for welding stationary blades to the inner and outer wheels of the turbine diaphragm according to the electron beam welding, without causing welding defects.

According to the present invention, there is provided a welding method for welding dissimilar metals, wherein a filler metal is deposited on one of dissimilar metals, said filler metal being of the same material as that of the other of said dissimilar metals, and then the weld metal thus deposited is machined to provide a joint surface adapted for welding, after which electron beam welding is applied along the interface formed between said joint surface of said weld metal and that of the other member of said dissimilar metals.

FIG. 4b is a side view of beads of FIG. 4a; and

Figure 1:
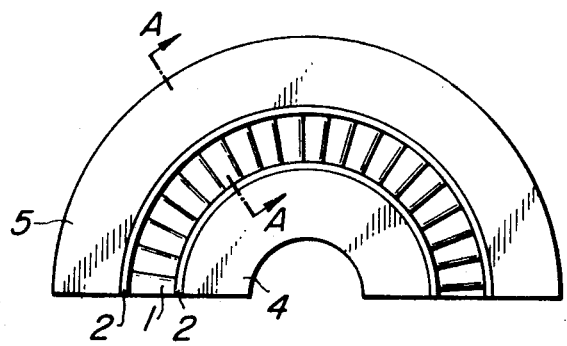
FIG. 1 is a front view of an outline of a turbine diaphragm adapted to be positioned in opposing relation to a turbine blade.

As shown in a plan view in FIG. 1, the construction of a turbine diaphragm disposed in opposing relation to a rotor blade within the casing of a steam turbine is such that stationary blades 1 presenting flow paths for steam are welded rigidly through the medium of partition walls 2 to inner and outer wheels 4 and 5, respectively.

Figure 2:
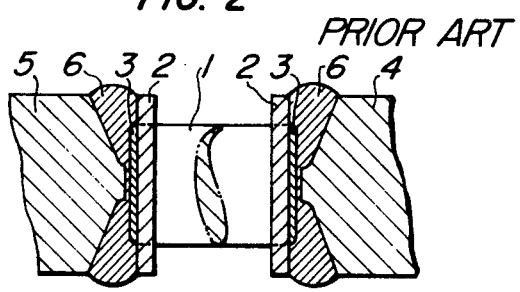
FIG. 2 is a partial cross sectional view of the welded construction of a prior art turbine diaphragm, taken along the line A—A of FIG. 1.

FIG. 2 shows a prior welded construction of a turbine diaphragm, taken along the line A—A of FIG. 1. According to the prior art welding method for a turbine diaphragm, the stationary blades 1 are fitted in a plurality of such slots provided through the partition walls 2, which have the same cross sectional configuration as those of the stationary blades, and then the fitted portions of the stationary blades are welded by using filler metals according to the manual arc welding from the side of an inner wheel or outer wheel. Then, build-up welding is applied by using filler metals to provide a build-up portion 6 in the grooves or gaps defined between the inner wheel 4 and partition walls 2, and between the outer wheel 5 and the partition walls 2 respectively, according to submerged arc welding. In this respect, the aforesaid grooves or gaps are provided in a symmetrical relation on both upper and lower sides of the respective wheels. In this manner, there is achieved a welded construction of a turbine diaphragm consisting of the stationary blades 1 and the inner and outer wheels 4 and 5, respectively.

However, according to the aforesaid welding method of a turbine diaphragm, 50 to 150 passes are required for obtaining the build-up portion 6, such that there will result the use of a great amount of man power and consumption of welding wires, or filler metals, and furthermore, a considerable degree of deformation of a welded construction will result.

In addition, since the material of the stationary blades 1 is usually of 12Cr stainless steel, the preheating temperature and pass-to-pass temperature should be maintained to no less than 250°C, thus requiring the use of an oven, in which the materials to be welded are placed, thus resulting in difficulties in welding operations.

Furthermore, if, instead of the aforesaid submerged arc welding, the electron beam welding which utilizes impulsive heat due to the high speed electron beams in vacuum is used to weld the partition walls to the inner and outer wheels, there will arise another difficulty, because partition walls are made of 12Cr stainless steel (Cr content is 12 %)), while the inner and outer wheels, 4, 5 are made of a carbon steel or low alloy heat resisting steel, i.e., providing the so-called dissimilar metal construction. (The electron beam welding will be referred to as 'EBW' hereinafter.) Turning back to the application of the EBW to the dissimilar metals, there arise shortcomings in that beads formed are apt to be deflected and welds formed tend to include non-welded spots for the following reasons. Upon welding of the dissimilar metals, there will be created a hot junction and a cold junction within the materials being welded and thus the resulting thermal electromotive force will bring about the flow of electric currents. (In this respect, the greater the difference between the thermal electromotive forces, the greater will be the electric current.) The aforesaid electric current thus produced then brings about a stray magnetic field, such that welding beams are deflected midway due to the interaction between the component of a magnetic field, which is in the direction of a welding axis, and electron beams.

Figure 3:
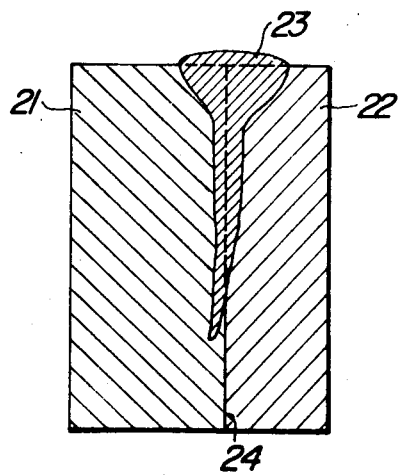
FIG. 3 is a partial cross-sectional view showing the configurations of beads formed between dissimilar metals according to the electron beam welding.

FIG. 3 shows as an example of the aforesaid case a weld formed between the dissimilar metals, i.e., between a maraging steel 21 which has been subjected to maraging treatment, that is, strengthening heat treatment and a member 22 made of Renn 41 consisting in weight percent of 0.10 C, 0.10 Si, 0.05 Mn, 119.0 Cr, 56.0 Ni, 10.0 Co, 10.0 Mo, 3.0 Ti, 1.5 Al and 0.01 B. In this figure, the bead 23 or weld formed according to EBW is shown deflected from a joint interface 24.

Figure 4A:
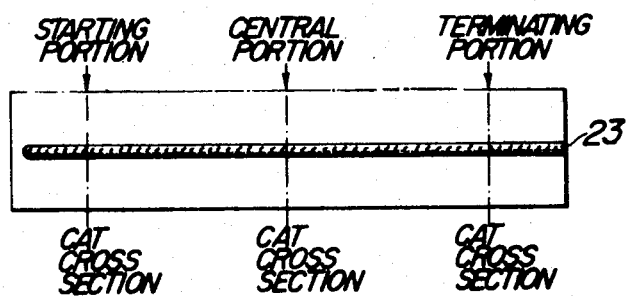
FIG. 4a is a top view of means for measuring deflections of beads formed, when an electron beam welding is applied along the interface formed between the joint surfaces of dissimilar metals or those of metals of the same material.
Figure 4B:
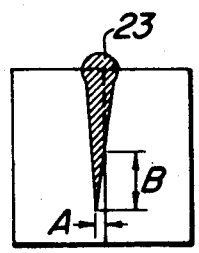

Butt-welding tests were given for deflections of weld beads by using combinations of members which are of the same material and of dissimilar materials. In this test, however, artificial factors and physical factors which affect the defection of a bead are excluded to a sufficient extent beforehand. As shown in FIG. 4a, the butt-welded joints of the same material and dissimilar materials were prepared according to EBW, and then the butt-welded joints were cut at several cross sections, one of which is shown in FIG. 4b. As shown, the extents of deflection of the bead were measured in every cross section.

Four combinations were used as dissimilar metals by combining together roll carbon steel SB-42 (Japan Industrial Specification), SUS38 and SUS50 (martensite stainless steel containing 12 % Cr. i.e., the combinations of SB42 - SB42, SUS50 - SUS50, SB42 - SUS38, and SB42 - SUS50. Table 1 shows the results of measurements on the deflections of beads formed according to EBW.

features of the present invention will be described with reference to a turbine diaphragm shown in the drawings, in which dissimilar metals are welded according to EBW.

Figure 5:
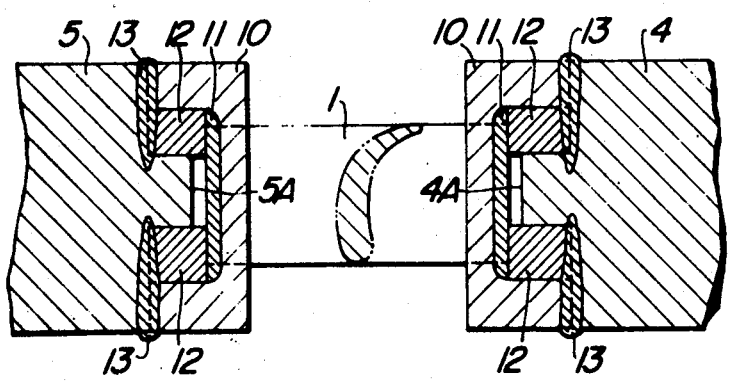
FIG. 5 is a partial cross sectional view, taken along the line A—A of FIG. 1, of the welded construction of a turbine diaphragm embodying the present invention, according to an electron beam welding.

Referring to FIG. 5, shown at 10 are an improved partition walls made of low alloy heat resisting steel of the same material as that of the inner wheel 4 and an outer wheel 5, the aforesaid walls 10 having annular recessed portions along the center lines thereof, respectively. There are provided in the bottom portions of the recessed portions slots having the same cross sectional configurations as those of stationary blades 1. The stationary blades 1 are fitted in the aforesaid slots. Then, seal welding is applied for the stationary blades 1 and partition walls 10 to provide a weld joints 11 to thereby rigidly affix the stationary blades 1 to the partition walls 10. Then, build-up welding is applied to the recessed portions of the partition walls 10 to provide build-up portions 12 in a manner that the portions 12 extend to positions flush with the upper edges of the recessed portions of the partition walls. The material of the build-up portions 12 is exactly or substantially the same as that of the partition walls 10. The stationary blades 1 are further rigidly affixed to the partition walls 10. the reason why the seal welding and build-up welding are not applied from the side of the stationary blades is that the welds being formed will interfere with the smooth flow of vapor flowing through the stationary blades 1. Furthermore, the amount of the build-up portions 12 may be such as to satisfactorily join the stationary blades 1 to the inner wheel 4 and outer wheel 5. Then, the build-up portions 12 or deposited portions are machined in a manner that the end faces of the build-up portions 12 will be flush with the surfaces of the partition walls 10 or that the shape of the build-up portions 12 will be well adapted to receive projections 4A and 5A of the inner wheel 4 and outer wheel 5 therein. Thereafter, the projections 4A and 5A are fitted between the machined surfaces of the build-up portions 12, after which EBW is applied to the joint surfaces between the partition walls 10/build-up portions 12 deposited on the partition walls 12 and inner wheel 4/outer wheel 5. The aforesaid joint surfaces do not include the open edges of the projections 4A and 5A which are interposed between the build-up portions 12. The reason why there are provided the recessed portions for the partition walls 10 is that there is a danger of the partition walls 10 of being subjected to Table 1

Results of measurements on deflections of beads caused by combinations of dissimilar metals

| | Combination of materials | Bead No. | Direction of deflection | Deflection of bead (mm) | | | | | |
|---|---|---|---|---|---|---|---|---|---|
| | | | | Starting portion | | Center portion | | Terminating portion | |
| | | | | A | B | A | B | A | B |
| Butt-welding of members of the same materials | SB42 + SB42 | 453 | no deflection | 0 | 0 | 0 | 0 | 0 | 0 |
| | | 454 | no deflection | 0 | 0 | 0 | 0 | 0 | 0 |
| | SUS50 + SUS50 | 508 | no deflection | 0 | 0 | 0 | 0 | 0 | 0 |
| | | 509 | no deflection | 0 | 0 | 0 | 0 | 0 | 0 |
| Butt-welding of members of dissimilar materials | SB42 + SUS38 | 432 | to the side of SUS38 | 0.24 | 4.7 | 0.30 | 3.2 | 0.32 | 4.2 |
| | | 433 | to the side of SUS38 | 0.20 | 4.5 | 0.27 | 3.8 | 0.26 | 3.1 |
| | SB42 + SUS50 | 479 | to the side of SUS50 | 0.51 | 9.0 | 0.65 | 12.4 | 0.55 | 9.2 |
| | | 480 | to the side of SUS50 | 0.58 | 11.0 | 0.71 | 12.5 | 0.69 | 11.0 |

It was confirmed from the results of the tests that, in case the dissimilar metals are welded according to EBW, the deflections of beads result due to the creation of the aforesaid stray magnetic field. Now, the 'burn-through', because the thickness of the partition walls are about 6 mm, whereas the width of the beam ranges from 2 to 4 mm. For this reason, the thickness of the partition walls are increased to about 10 mm, and in addition, build-up portions or deposited portions 12 are provided for joining the stationary blades 1 to the inner and outer wheels, 4 and 5, respectively. The entire surfaces of the recessed portions may be build-up to increase the thickness of the partition walls 10. However, if the thickness of the build-up portions are excessive, then there will result deformation in welds, when EMW is applied, thus failing to provide a desired accuracy.

On the other hand, the reason why the EBW is applied through the medium of build-up portions 12 to the inner and outer wheels 4 and 5 and stationary blades 1 is that there is a risk of occurance of solidification cracking in the weld metals 13. This is because in case the stationary blades 1 made of 12Cr stainless steel are welded to the partition walls 10 to provide deposited metals 11 according to the seal welding, the 13Cr steel will be fused with the deposited metal 11, and as a result chrominum in amount of 4 to 6 % will be contained in the deposited metals 11. It follows from this that in case the deposited metals 11 are welded to the inner and outer wheels 4 and 5 which are made of 2¼ Cr - 1 Mo steel according to the EBW, the chrominum content in the weld metals 13 will be increased to 3 to 4 %, and thus the increase in content of chrominum leads to the aforesaid solidification cracking. For this reason, the deposited metals 11 are welded to weld metals 13 through the medium of build-up portions 12 which are made of the same material as those of the inner and outer wheels, rather than directly welded to the weld metals 13. This precludes the increase in Cr content, preventing solidification cracking.

The materials of the partition walls 10 and build-up portions 12 should not necessarily be the same as that of the inner and outer wheels 4 and 5 of a turbine diaphragm but may be such as not to cause the deflection of beams, when the electron beam welding is applied. In general, used as materials which are usable for the inner and outer wheels of the turbine diaphragm are 2¼ Cr — 1 Mo steel, 1 Cr — ½ Mo steel, ½ Mo steel, and mild steel. The increase in chrominum content by ¼ Cr or 0.25 % and in molybdenum contend by 1/5 Mo or 0.2 % in materials to be welded to the inner and outer wheels will not cause the deflection of beads formed according to the electron beam welding.

Alternatively, in case ordinary dissimilar metals, such as for instance, chrominum steel and carbon steel are welded together according to the EBW, yet in case there is limitation on the construction of carbon steel members, it is recommended that a small size carbon steel piece be welded to chrominum steel from the side of chrominum steel to provide fillet welds, after which the EBW is applied for a combination of carbon steel and small-size carbon steel piece, thus achieving welds between the chrominum steel and carbon steel.

In this respect, in case the bending stress and tensile stress which exert on fillet welds formed between the small-size carbon steel and chrominum steel are unfavorably great from viewpoints of the strength of welded construction of members, there are provided holes in the small size carbon steel, in which holes are fitted ends of chrominum steel, after which build-up welding is applied in a manner to cover the fitted portions of the chrominum steel. The aforesaid build-up welding may be separately accomplished into two steps, i.e., tack welding and ordinary fusion welding. However, it is imperative that material of the build-up portion to be joined to carbon steel be the same material as that of the aforesaid carbon steel, for preventing the deflection of beads formed according to the EBW.

Furthermore, in case a welded construction of a high accuracy is desired, the use of a great amount of build-up metal for welding the small-size carbon steel to chrominum steel will lead to a considerable thermal deformation due to heat input. For this reason, the small-size carbon steel is formed with recessed portions and then holes are provided in the bottom of the aforesaid recessed portions to cause the chrominum steel to be fitted in the aforesaid holes, after which a filler metal of the same material as that of the carbon steel is welded thereon to provide build-up portions on the carbon steel having recessed portions. Thus, chrominum steel is welded to the small-size carbon steel by using a small amount of filler metal for build-up welding. Then, the joint surfaces of the small size carbon steel, build-up weld and the joint surface of the carbon steel are welded rigidly according to the EBW.

As is apparent from the foregoing, the present invention permits welding of dissimilar metals according to the electron beam welding in a manner that the beads formed will not be deflected from the intended joint surface.

In addition, when the present invention is applied to the welding of a turbine diaphragm, there are provided welds formed according to the electron beam welding, which are free of the deflection of beams and thermal deformation.

What is claimed is:

1. A welding method for joining two dissimilar metal members comprising the steps of:
   a. forming a first joint surface on a first metal member,
   b. preparing a metal plate having a hole therethrough, said metal plate being substantially the same material as said first metal member,
   c. fitting an end portion of a second metal member into said hole of the metal plate, said second metal member being a different material than said first metal member,
   d. depositing a layer of at least one filler material in said hole for rigidly connecting said end portion of said second metal member to said metal plate and for providing a build-up layer of said deposited filler material extending through said hole from the connection with said end portion, said filler material being substantially the same material as said first metal member,
   e. forming a second joint surface on said metal plate and said build-up layer by machining at least one of said build-up layer and said metal plate to form substantially coplanar surfaces of said build-up layer and metal plate, said coplanar surfaces forming said second joint surface,
   f. positioning said first and second joint surfaces in contacting relation, and
   g. applying electron beam welding along the interface between said first and second joint surfaces of substantially the same material, thereby joining said first and second metal members to each other through said metal plate and said build-up layer of deposited filler material.

2. A welding method according to claim 1, wherein said step (d) is performed until said build-up layer of deposited filler material extends from the rigid connection with said end portion to approximately flush with a first surface of said metal plate opposite a second surface of said metal plate at which said end portion is fitted into said hole during said step (c), said first surface forming one of said substantially coplanar surfaces.

3. A welding method for joining two dissimilar metal members comprising the steps of:
 a. forming a first joint surface on a first metal member,
 b. preparing a metal plate having a recessed portion and a hole extending through said metal plate to said recessed portion, said metal plate being substantially the same material as said first metal member,
 c. fitting an end portion of a second metal member into said hole of the metal plate at a surface of said metal plate opposite to said recessed portion, said second metal member being a different material than said first metal member,
 d. depositing first filler metal into said recessed portion for rigidly connecting said end portion of said second metal member to said metal plate,
 e. depositing second filler metal into said recessed portion on the first deposited filler metal, thereby forming a second deposited metal layer, said second filler metal being substantially the same material as said first metal member,
 f. machining at least one of said second deposited metal layer and said metal plate to form substantially coplanar surfaces of said second deposited metal layer and said metal plate, said coplanar surfaces forming a second joint surface,
 g. positioning said first and second joint surfaces in contacting relation, and
 h. applying electron beam welding along the interface between said first and second joint surfaces of substantially the same material, thereby joining said first and second metal members through said metal plate and said first and second deposited filler metals.

4. A welding method according to claim 3, wherein said step (e) is performed until said second deposited layer extends from said first deposited filler metal through said recessed portion to approximately flush with a first surface of said metal plate opposite a second surface of said metal plate at which said end portion is fitted into said hole during said step (c), said first surface forming one of said substantially coplanar surfaces.

5. A welding method according to claim 4, wherein said step (f) is performed by machining only said second deposited layer extending through said recessed portion to form a surface of said machined second deposited layer coplanar with said first surface of said metal plate, thereby forming said second joint surface.

6. A welding method for connecting stationary blades to inner and outer wheels of a turbine diaphragm, the material of said stationary blades being dissimilar to that of said inner and outer wheels, comprising the steps of:
 a. preparing annular partition walls for holding stationary blades of a turbine diaphragm, said partition walls being substantially the same material as inner and outer wheels of the turbine diaphragm,
 b. forming recessed portions having U-shaped sections in each of said partition walls,
 c. forming a plurality of holes through each of said partition walls to communicate with said recessed portions,
 d. fitting respective ends of said stationary blades into said holes of each of said partition walls to extend into said recessed portions,
 e. depositing first filler metal into said recessed portions to rigidly join said respective ends to said partition walls,
 f. depositing second filler metal into said recessed portions to form second deposited metal layers on the deposited first filler metal layers, said second filler metal being substantially the same material as said inner and outer wheels,
 g. machining outer surfaces of said second deposited metal layers to provide first joint surfaces for welding,
 h. preparing second second joint surfaces on each of said inner and outer wheels,
 i. abutting said first and second joint surfaces in contacting relation, and
 j. applying electron beam welding along interfaces formed betwen said first and second joint surfaces of substantially the same material, thereby forming weld joints between said partition walls rigidly joined to said stationary blades and said inner and outer wheels.

7. A welding method according to claim 6, wherein said outer surfaces of said second deposited metal layers are machined to form coplanar surfaces to associated surfaces of each of said partition walls so that the coplanar machined surfaces and associated surfaces of said partition walls form said first joint surfaces for welding.

8. A welding method according to claim 6, further comprising the steps of forming projections on said second joint surfaces of said inner and outer wheels, and forming recesses in said first joint surfaces of said second deposited metal layers, said projections being fitted into said recesses in said first joint surfaces.

* * * * *